(12) United States Patent
Sachtleben (10) Patent No.: US 10,123,655 B2
(45) Date of Patent: Nov. 13, 2018

(54) THERMOS FLASK

(71) Applicant: MELITTA EUROPA GMBH & CO. KG, Minden (DE)

(72) Inventor: Andreas Sachtleben, Minden (DE)

(73) Assignee: MELITTA EUROPA GMBH & CO. KG, Minden (DE)

(*) Notice: Subject to any disclaimer, the term of this patent is extended or adjusted under 35 U.S.C. 154(b) by 0 days.

(21) Appl. No.: 15/128,961

(22) PCT Filed: Mar. 19, 2015

(86) PCT No.: PCT/EP2015/055760
§ 371 (c)(1),
(2) Date: Sep. 23, 2016

(87) PCT Pub. No.: WO2015/144550
PCT Pub. Date: Oct. 1, 2015

(65) Prior Publication Data
US 2017/0215644 A1 Aug. 3, 2017

(30) Foreign Application Priority Data
Mar. 24, 2014 (DE) .................... 20 2014 101 352 U (51) Int. Cl.
*A47J 41/00* (2006.01)

(52) U.S. Cl.
CPC ........ *A47J 41/0022* (2013.01); *H05K 999/99* (2013.01)

(58) Field of Classification Search
CPC .... A47J 41/0022; A47J 41/00; A47J 41/0005; A47J 41/0011; A47J 41/0016; B65D 25/282; B65D 25/42; B65D 41/38
USPC ....... 222/475.1, 472–475; 141/331, 336, 345
See application file for complete search history.

(56) References Cited

U.S. PATENT DOCUMENTS

| | | | | |
|---|---|---|---|---|
| 5,609,194 A | * | 3/1997 | Link ................... | A47G 19/12 141/331 |
| 5,947,343 A | * | 9/1999 | Horstmann ......... | A47J 41/0022 222/472 |
| 5,988,457 A | * | 11/1999 | Andrew ................ | A47G 19/12 222/475.1 |

(Continued)

FOREIGN PATENT DOCUMENTS

| DE | 19907195 A1 | 8/2000 |
|---|---|---|
| DE | 602005006285 T2 | 7/2009 |

(Continued)

OTHER PUBLICATIONS

International Search Report for PCT/EP2015/055760, dated Jun. 1, 2015.

(Continued)

*Primary Examiner* — Lien Ngo
(74) *Attorney, Agent, or Firm* — Fisherbroyles, LLP; Robert Kinberg (57) ABSTRACT

A thermos flask comprises a container that has, on the upper side, an opening on which a lid is held. The lid closes the opening when in a closed position and is able to be at least partially moved by means of an actuation element in order to partially release the opening such that liquid can be poured out. The lid is able to be placed on a receiving portion of the container and is held in the closed position by means of a detent.

6 Claims, 10 Drawing Sheets

(56) References Cited

U.S. PATENT DOCUMENTS

| | | | | |
|---|---|---|---|---|
| 6,216,754 | B1* | 4/2001 | Geroult | A47G 19/14 |
| | | | | 141/21 |
| 6,997,104 | B1 | 2/2006 | Lin | |
| 7,552,846 | B2* | 6/2009 | Ohm | A47G 19/145 |
| | | | | 222/108 |
| 8,985,406 | B2* | 3/2015 | Tachi | B65D 59/02 |
| | | | | 222/472 |
| 2002/0063141 | A1* | 5/2002 | Hirose | A47J 41/0027 |
| | | | | 222/131 |
| 2003/0150886 | A1 | 8/2003 | Nybakke | |
| 2003/0226859 | A1* | 12/2003 | Takagawa | A47G 19/14 |
| | | | | 222/470 |

FOREIGN PATENT DOCUMENTS

| | | | |
|---|---|---|---|
| EP | 0158244 | A1 | 10/1985 |
| EP | 0887038 | A2 * | 12/1998 |

OTHER PUBLICATIONS

Written Opinion for PCT/EP2015/055760, dated Jun. 1, 2015.
German Search Report for DE 20 2014 101 352.0, dated Jul. 18, 2014.
English Translation of German Search Report for DE 20 2014 101 352.0, dated Jul. 18, 2014.

* cited by examiner

THERMOS FLASK

CROSS-REFERENCE TO RELATED APPLICATIONS

This application is a U.S. National Stage Application of International Patent Application No. PCT/EP2015/055760, filed Mar. 19, 2015, which claims benefit of German Patent Application No. 20 2014 101 352.0, filed Mar. 24, 2014.

TECHNICAL FIELD

The present invention relates to a thermos flask, comprising a container having an opening on the upper side, on which a lid is held, the lid closing the opening when in a closed position and being able to be at least partially moved by means of an actuation element in order to partially release the opening such that liquid can be poured out.

BACKGROUND OF THE INVENTION

DE 199 07 195 discloses a thermos flask, in which a container is sealed by a lid. The lid is pivotably mounted via a tilting edge and an actuating lever in order to produce a pouring opening. As a result of a closing spring arranged between the actuating lever and the handle, the lid is pretensioned into a closed position. The lid can inadvertently be opened and closed by striking against objects. Furthermore, the mounting of the lid is complex, which is held on the container handle via additional connecting elements. Complete removal of the lid requires several mounting steps.

SUMMARY OF THE INVENTION

The present invention is therefore based on the object of providing a thermos flask in which the lid is easy to mount and dismount for the user.

The above and other objects are achieved by a thermos flask which, in one embodiment, comprises a container having an upper side with an opening; an actuation element; and a lid held on the upper side to close the opening when the lid is in a closed position, the lid being operable to at least partially be moved by the actuation element to partially release the opening such that liquid can be poured out of the container, wherein the lid includes at least one detent and is held on the upper side of the container by the at least one detent.

Therefore, in the case of the thermos flask in accordance with the invention, the lid is mountable on a receiver of the container and is held in the closed position by means of a detent. As a result, the bolting of the lid or fixing via a bayonet catch can be avoided, in which several mounting steps are regularly necessary, wherein the mounting of the lid needs to occur in particular with two hands. In the solution in accordance with the invention, the lid can be inserted and latched onto the container in a simple manner from above, which allows one-hand operation.

For effective mounting, the detent can comprise at least one flexible spring web, and in one embodiment flexible spring webs are provided on opposite sides of the lid. Each flexible web can comprise an outwardly directed detent projection which can be fixed on a detent projection of the container.

For the purpose of simple handling, each flexible spring web can comprise an actuating section, by means of which the spring webs can be pressed to the inside for releasing the detent connection. The removal of the lid can also occur with only one hand.

Further advantages of the invention are explained in the dependent claims.

BRIEF DESCRIPTION OF THE DRAWINGS

The invention will be explained below in closer detail by reference to an embodiment shown in the enclosed drawings, wherein.

DETAILED DESCRIPTION OF THE INVENTION

Figure 1:
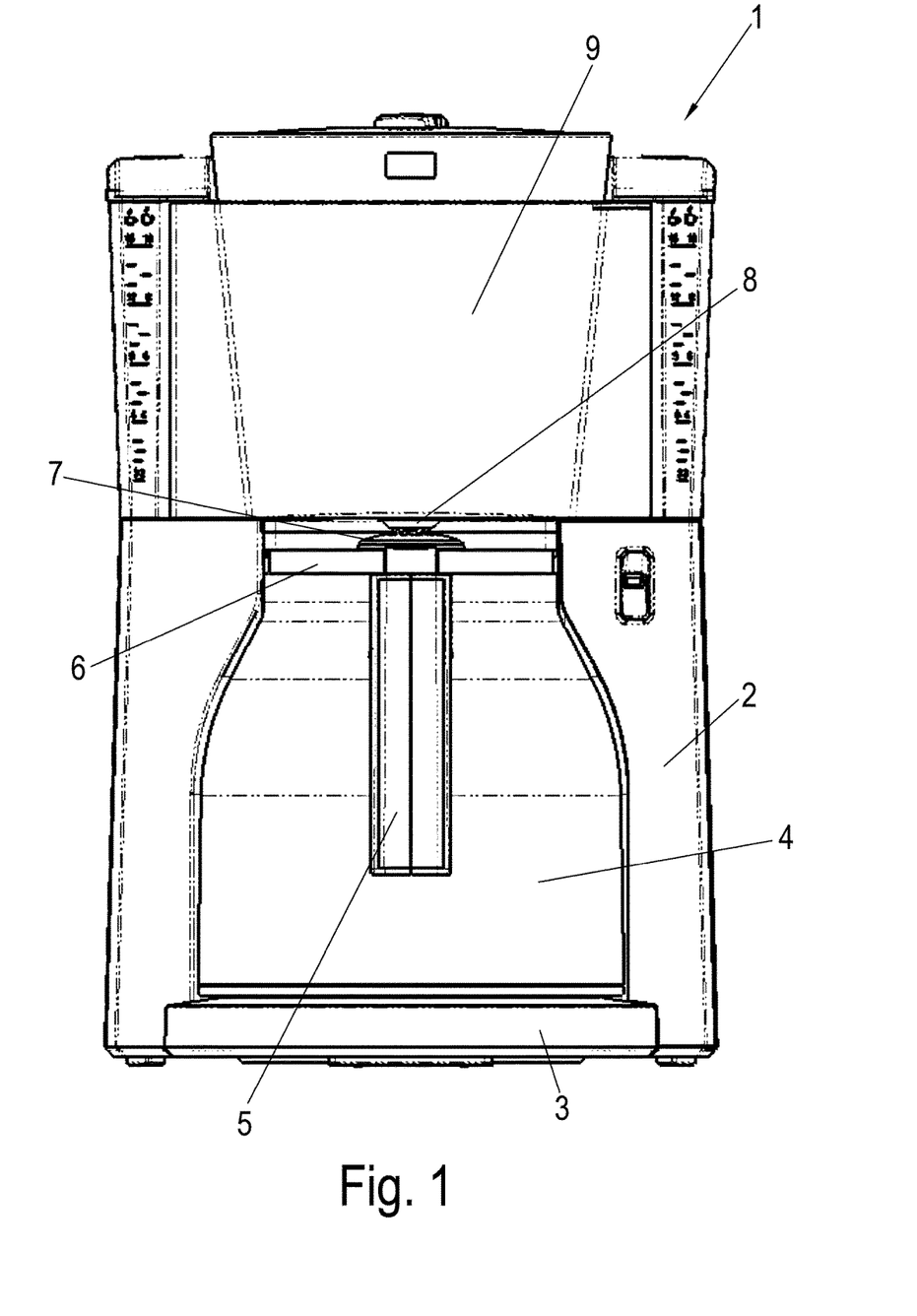
FIG. 1 shows a view of a coffee machine with a thermos flask in accordance with the invention.

A coffee machine 1 comprises a housing 2, on which a base plate 3 is provided on which a thermos flask with a container 4 and a lid 6 is deposited. A protruding handle 5 is provided on the container 4 in order to remove the thermos flask from the coffee machine 1 or to insert it into the machine. A receiver 9 for a filter paper insert with ground coffee is provided above the lid 6, so that water can flow from above in an outlet 8 via a valve 7 into the container 4.

Figure 2:
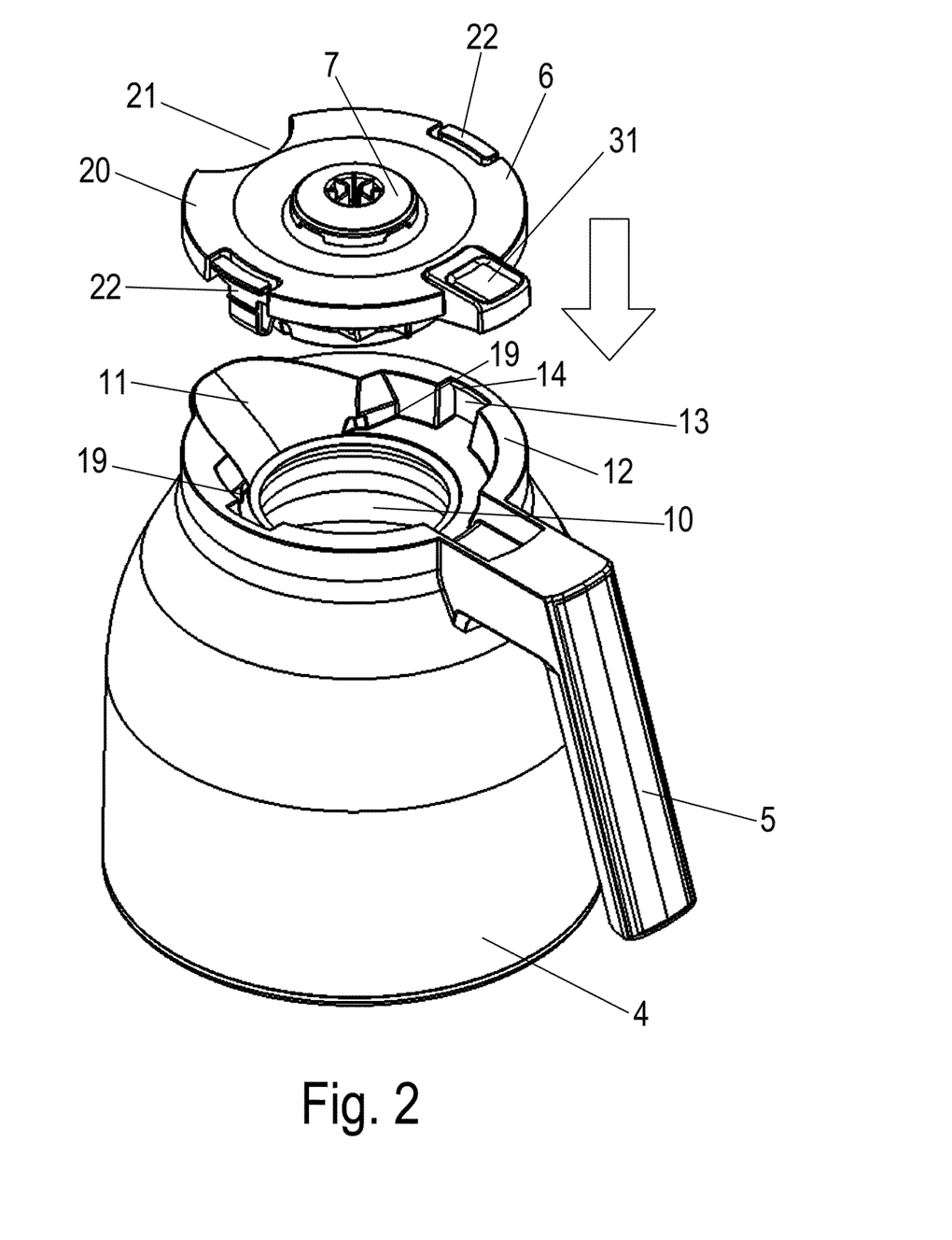
FIG. 2 shows a perspective view of the thermos flask with removed lid.

FIG. 2 shows the thermos flask with the removed lid 6. The container 4 comprises a cylindrical opening 10 at the upper end, which is surrounded by an annular edge 12. A protruding spout 11 is formed on the edge 12, which is arranged on the side opposite the handle 5. Recesses 13 are formed on opposite sides of the edge 12, on which an inwardly protruding detent projection 14 protrudes in the upper region.

The lid 6 comprises an upper part 20, which can be latched onto the container 4. Detents in a form of spring webs 22 on opposite sides of the lid, come into engagement with the detent projections 14 when inserting the lid 6 from above in order to lock the upper part 20 of the lid 6 onto the container. An actuation element 31 is further provided on the lid 6, by means of which the opening 10 can be opened for pouring out liquid. On the side opposite the actuation element 31, a depression 21 is provided on the upper part 20 which is substantially circular in the top view, the depression being arranged in the region of the spout 11.

Figure 3:
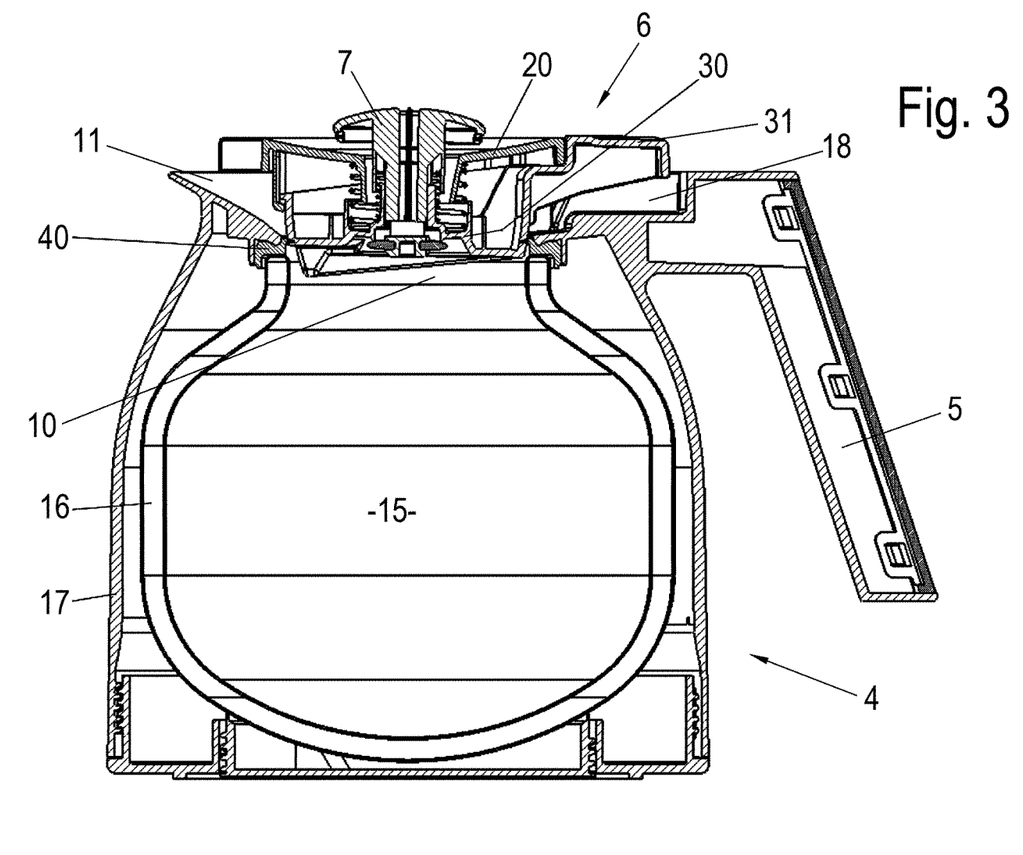
FIG. 3 shows a sectional view through the thermos flask with closed lid.

FIG. 3 shows the container 4 in a sectional view. The container 4 comprises an insulating glass body 16, in which an interior space 15 is provided for accommodating a liquid. A flask housing 17 is arranged around the insulating glass body 16, wherein the flask housing 17 is positioned spaced from the insulating glass body 16. The insulating glass body 16 comprises an upper opening 10, wherein a seal 40 is provided on the edge around the opening 10 between the insulating glass body 16 and the flask housing 17.

FIG. 3 further shows that a height-movable valve 7 is provided on the lid 6 in the middle, the valve engaging through the upper part 20 and being held on a bottom part 30 of the lid 6. The upper part 20 comprises an asymmetric opening for the valve 7.

Figure 4A:
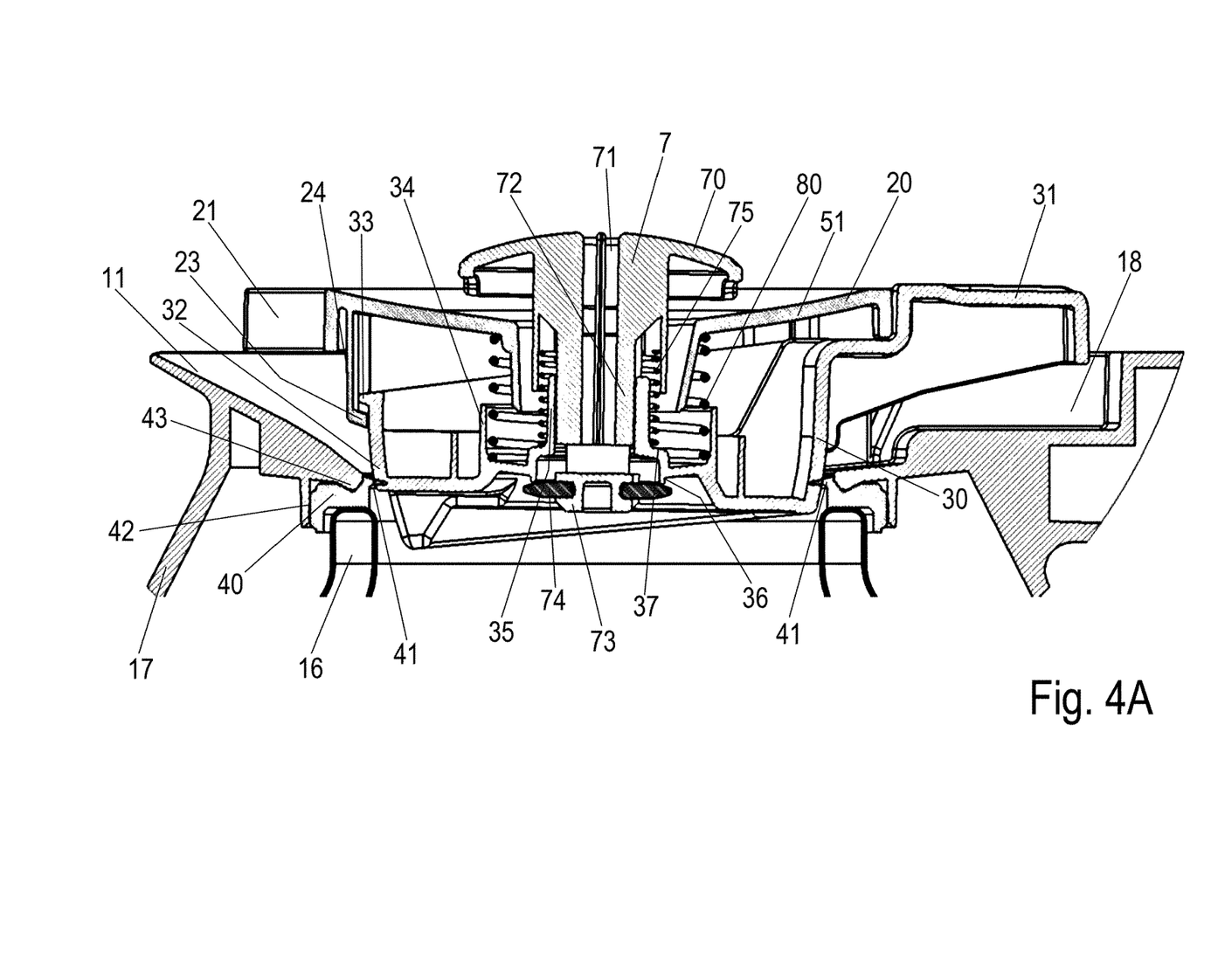
FIGS. 4A and 4B show two sectional views of the thermos flask in different positions.

FIG. 4A shows the lid 6 in detail in the closed position. The intermediate space between the insulating glass body 16 and the flask housing 17 is sealed by means of a seal 40, which comprises an inwardly protruding sealing lip 41. The seal 40 rests on an upper edge of the insulating glass body 16 and is upwardly pressed by a bulge 43 on the flask housing 17 against the edge of the insulating glass body 16. Furthermore, the seal 40 is supported to the outside by a web 42 on the flask housing 17.

The seal 40 not only seals the region between the insulating glass body 16 and the flask housing 17, but also the region opposite the lid 6 via the sealing lip 41. For this purpose, the sealing lip 41 is pressed against a side wall 32 of the bottom part 30 of the lid 6. The sealing lip 41 is shown in this illustration in a non-deformed manner. It actually rests on the paraboloid surface of the side wall 32. The side wall 32 is formed in an annular manner and can taper downwardly in the manner of a truncated cone or a parabola. The bottom part 30 is substantially formed in a cup-shaped manner and comprises an inner opening through which the valve 7 is guided.

In the closed position, the container 4 can be filled via the valve 7, wherein the valve 7 is formed in a substantially mushroom-head-shaped manner and comprises an upper arched surface 70, from which the liquid can run off and can meet an inwardly or downwardly inclined, trough-shaped receiver 51 of the upper part 20. When the thermos flask is inserted into the coffee machine 1, a projection comprising an outlet 8 presses against the valve 7 in order to press the valve slightly in the downward direction. The valve 7 is thus opened and an inlet channel 71 in a valve body 72 is arranged beneath the outlet 8 so that freshly brewed coffee is able to flow downwardly through the channel 71. The valve body 72 is formed with a holder 73 in the bottom region, on which an annular seal 74 is provided. The seal 74 rests with its upper side on a downwardly facing edge 36 of the bottom part 30. If the valve 7 is in the closed position, no coffee can flow into the container 4 or escape from the valve 7.

The valve body 72 is pretensioned in this process in the closed position. A spring 75 is provided for this purpose, which spring is supported on a step 39 on the bottom part 30 on the one hand and on a stop of the valve body 72 on the other hand. The seal 74 is thus pressed by means of the spring 75 to the closed position.

Furthermore, a second spring 80 is provided, by means of which the bottom part 30 is pressed away from the upper part 20. Both springs 75 and 80 are formed as helical springs.

The bottom part 30 is rotatably mounted on the upper part 20, adjacent to the actuation element 31. The actuation element 31, which is formed integrally with the bottom part 30, can be pressed downwardly, wherein a respective receiver 18 is provided for this purpose on the handle 5, which receiver permits a movement of the actuation element 31 in the downward direction.

Figure 4B:
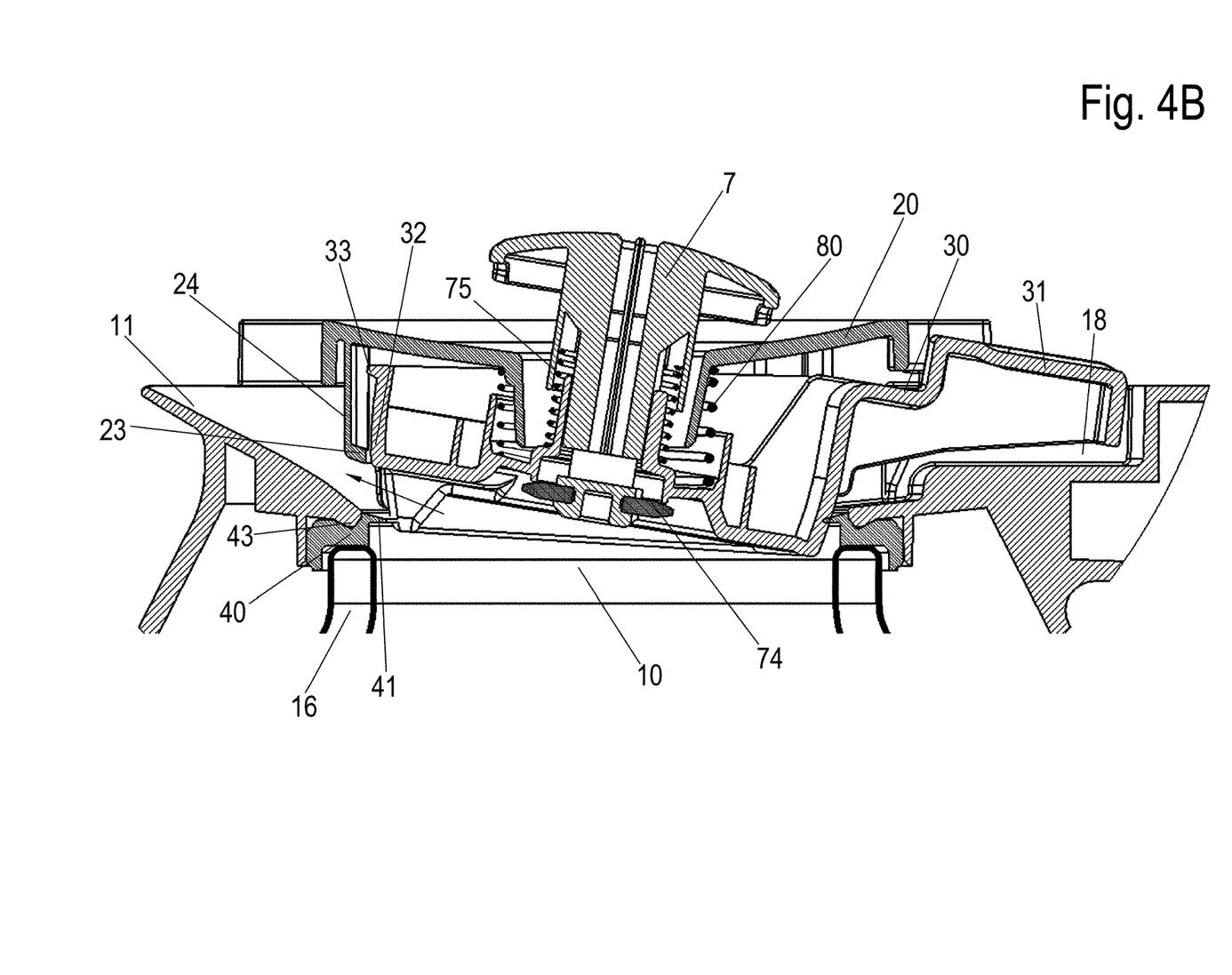

FIG. 4B shows the bottom part 30 that has been pivoted relative to the upper part 20, in that the actuation element 31 has been pressed downwardly. The bottom part 30 is thus pivoted upwardly on the side opposite the handle 5, through which the side wall 32 is partly lifted off from the sealing lip 41. This allows a liquid to be poured out via the spout 11, as indicated by the arrow.

If the actuation element 31 is now released, the spring 80 presses the bottom part 30 back to the closed position, on which the side wall 32 rests on the sealing lip 41. The pivoting motion of the bottom part 30 is limited in this process by an outwardly protruding stop 33, which comes to lie on a holder 23 on a side wall 24 of the upper part 20.

Figure 5:
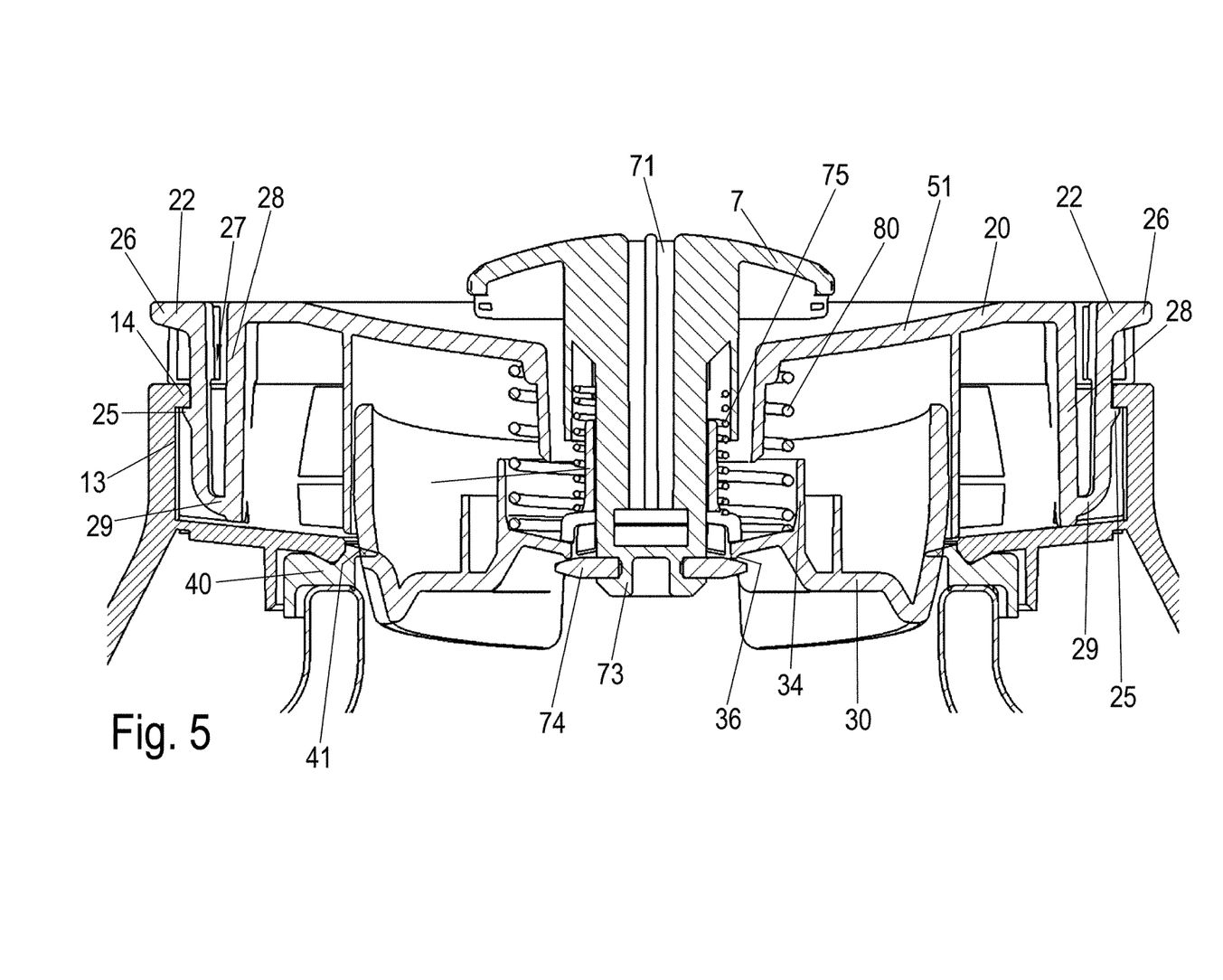
FIG. 5 shows a sectional view through the lid of the thermos flask in the region of a detent mechanism.

The lid 6 is shown in FIG. 5 in a sectional view through the detents. The detents are formed as flexible spring webs 22, wherein a spring web 22 is respectively formed in an integral manner with the upper part 20 on opposite sides. Each spring web 22 comprises an outwardly directed detent projection 25, which engages behind the detent projection 14 on the recess 13 of the flask housing 17. An actuating section 26 is formed above the detent projection 14 on the spring web 22, which actuating section protrudes outwardly and can be gripped easily by a user because the actuating section 26 is arranged via a handle gap spaced from the detent projection 14. The user can easily press the spring web 22 to the inside because the spring web 22 is arranged with a gap 27 from a side wall 28 of the upper part 20, and the side wall 28 is connected via a U-shaped deflecting portion 29 to the spring web 22. The user can thus compress the two spring webs 22 with one hand and remove the lid 6 upwardly from the container 4, which simplifies handling.

In order to mount the lid 6 on the container 4, it is mounted from above on the container 4, wherein respective guides are provided on the edge 12 in order to facilitate positioning of the lid 6. When the lid 6 is placed on the container 4, one or more guides on the edge 12 press the lid 6 in the forward direction. In this process, ribs 46 on the upper part 20 are pushed beneath corresponding recesses 19 in the pouring edge (FIG. 2). The ribs 46 then lie in the recess 19 and beneath an edge of the pouring edge, so that a movement of the upper part 20 in the upward direction is prevented. Since the ribs 46 are only very short, they do not obstruct any removal of the lid 6 after the unlocking of the spring webs 22 from the container 4. Instead of the two ribs 46 it is also possible to provide only one rib 46 or more than two ribs.

The lid 6 is then inserted from above onto the opening 10 until the detent projections 25 on the spring webs 22 are latched behind the detent projections 14. In this position, the sealing lips 41 of the seal 40 rest on the side walls 32 of the bottom part 30 and provide the necessary sealing.

Figure 6:
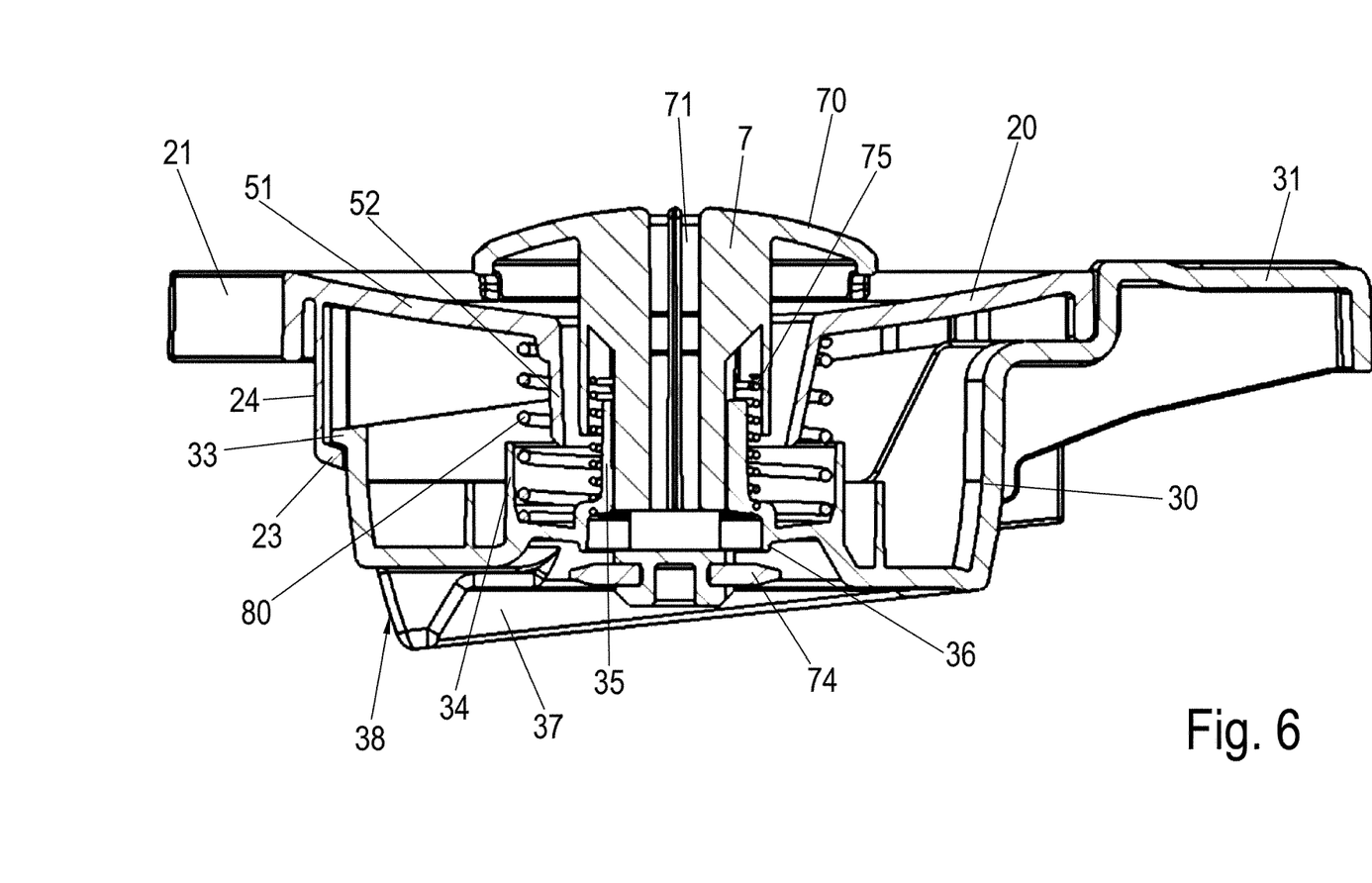
FIG. 6 shows a sectional view through the removed lid.

FIG. 6 shows the lid 6 with the valve 7 in the open position. The valve 7 is pressed slightly downwardly against the force of the spring 75 by a projection (not shown), so that the valve 7 has moved away in the downward direction from the edges 36, so that a liquid can flow through the intermediate space between the valve 7 and the edges 36 into the container 4. If a small amount of liquid should flow from the valve 7 on the arched surface 70 onto the trough-shaped receiver 51 of the upper part 20, the liquid reaches a receiver between two upwardly protruding annular walls 34 and 35 via a downwardly directed nozzle 52 on the trough-shaped receiver 51, on whose base region inner openings are provided, so that the liquid can flow to the inside within the edge 36. The openings are thus arranged above the seal 74, so that the liquid, when the valve 7 is open, can now flow into the container 4. The valve 7 can then be closed when removing the thermos flask from the coffee machine 1 in that the spring 75 presses the valve body 72 in the upward direction, so that the seal 74 rests on the edge 36 in a sealing manner and thus seals the upwardly disposed region.

The bottom part 30 is not arranged in a horizontally flat manner in the downwardly directed region, but comprises an edge 37 which extends obliquely to the outside from the side of the actuation element 31 to the side of the depression 21. The edge 37 is provided in the region of the spout 11 with a recess 38, so that the liquid, when pivoting the bottom part 30 relative to the upper part 20, flows through the recess 38 into the spout 11 in a purposeful manner while the edge 37 rests on the sealing lip 41 and a seal is provided in this region. It is thus prevented that liquid can flow out laterally on the lid 6. A small section 45 is further provided in the bottom region of the edge 37. The small lateral section 45 ensures that during pouring, when liquid leaves the container 4, the air can flow back into the container 4. The section 45 is arranged in such a way that it lies beneath the sealing line of the seal 40 when the lid is closed and the bottom part 30 is in the closed position. In the closed position of the bottom part 30, the seal 40 rests on the edge 37. The lid 6 is thus tightly sealed and a temperature loss is avoided. If the bottom part 30 is pivoted to an opening position, the recess 38 and the section 45 move beyond the sealing line of the seal 40 and release the path to the spout 11 and the section 45 as the venting opening. It is also possible to provide several small sections 45 for the subsequent flow of air when pouring on the edge 37.

Figure 7:
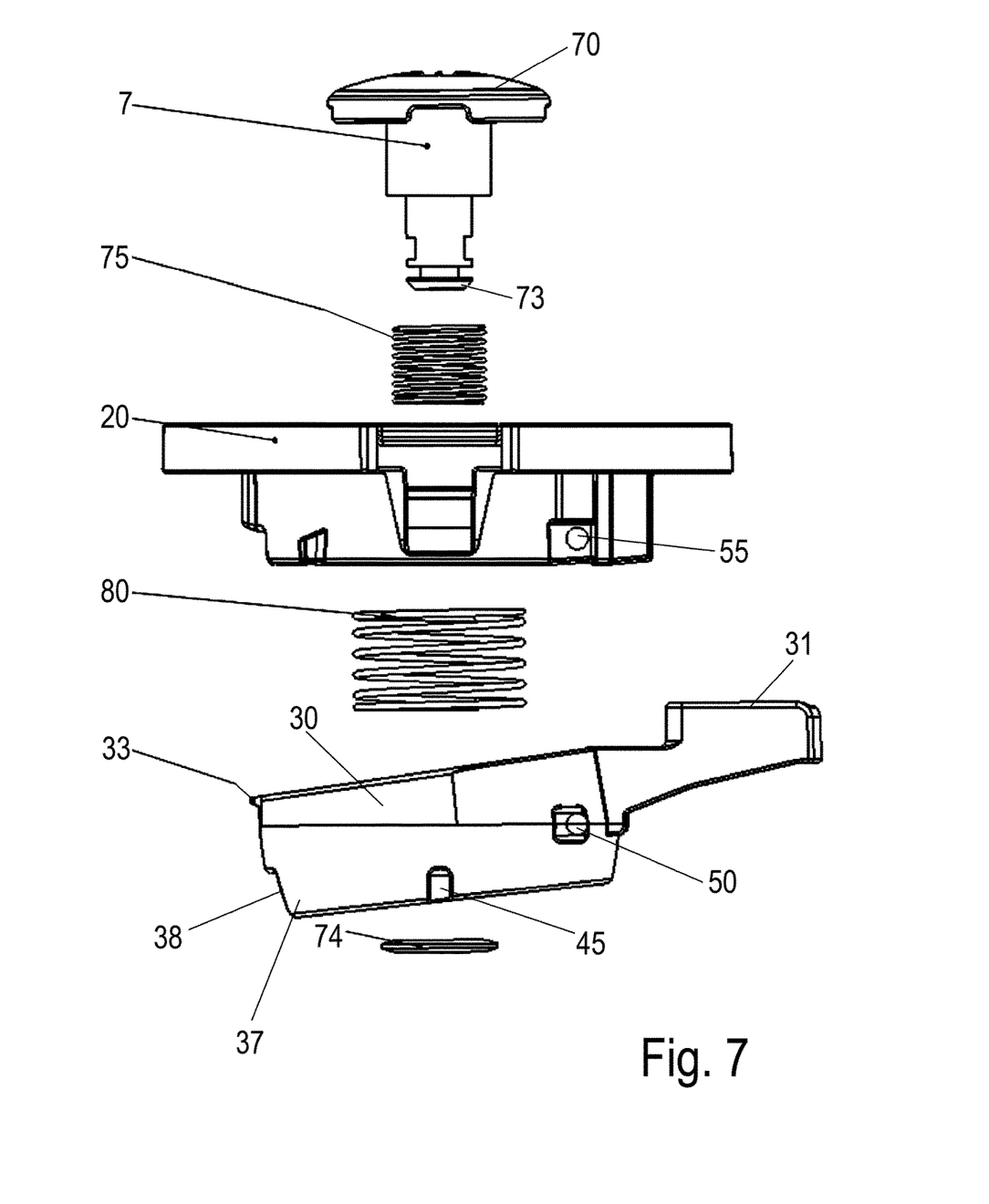
FIG. 7 shows an exploded view of the lid.

The lid is shown in an exploded view in FIG. 7. Valve 7 passes through the upper part 20 with a part of the valve body, wherein the upper part 20 can releasably be latched onto the container 4. A bearing receiver 55 is formed on the upper part 20 on opposite sides, into which a bearing pin 50 of the bottom part 30 engages. The bearing pin 50 is arranged eccentrically on the side of the actuation element 31 and allows pivoting of the bottom part 30 about a horizontal axis relative to the upper part 20. The spring 80 is provided in order to pretension the bottom part 30 in the closed position. The spring 75 is further supported on the bottom part 30 in order to also pretension the valve 7 in the closed position.

Figure 8:
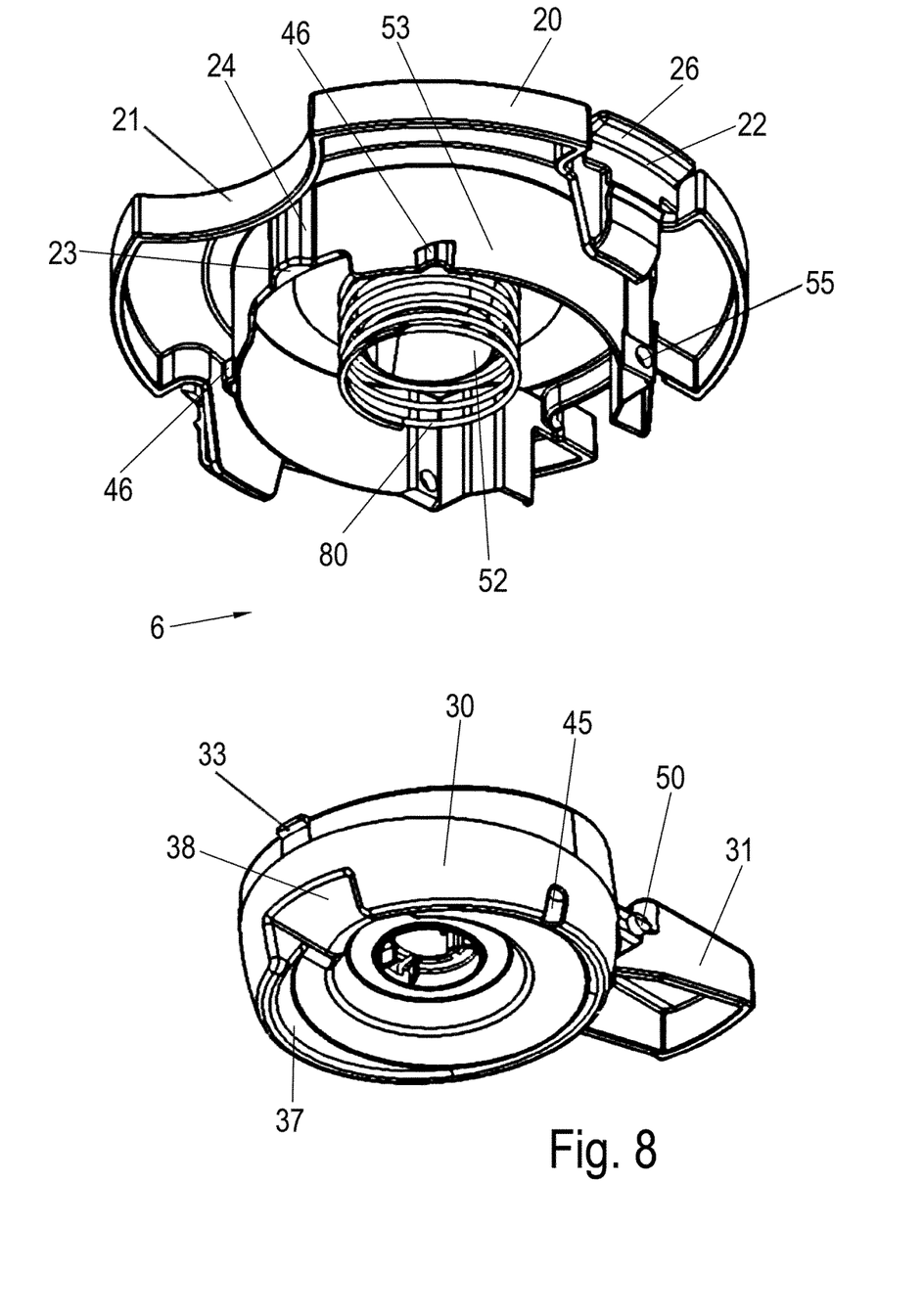
FIG. 8 shows a perspective exploded view of the lid from below.

FIG. 8 shows the lid 6 in a perspective exploded view, in which the bearing recesses 55 can be recognised on the upper part 20. The illustration further shows that the side wall 24 is provided on the upper part 20 adjacent to the depression 21, on which an inwardly protruding holder 23 is arranged, which prevents that the bottom part 30 can be pivoted further in the downward direction. The stop 33 is provided for this purpose on the bottom part 30. The recess 38 is further provided on the bottom part 30 on the nearly annular edge 37, by means of which the liquid can then reach the spout 11. The lid 6 consists of only six parts and can therefore be produced and mounted in an especially effective manner.

Figure 9:
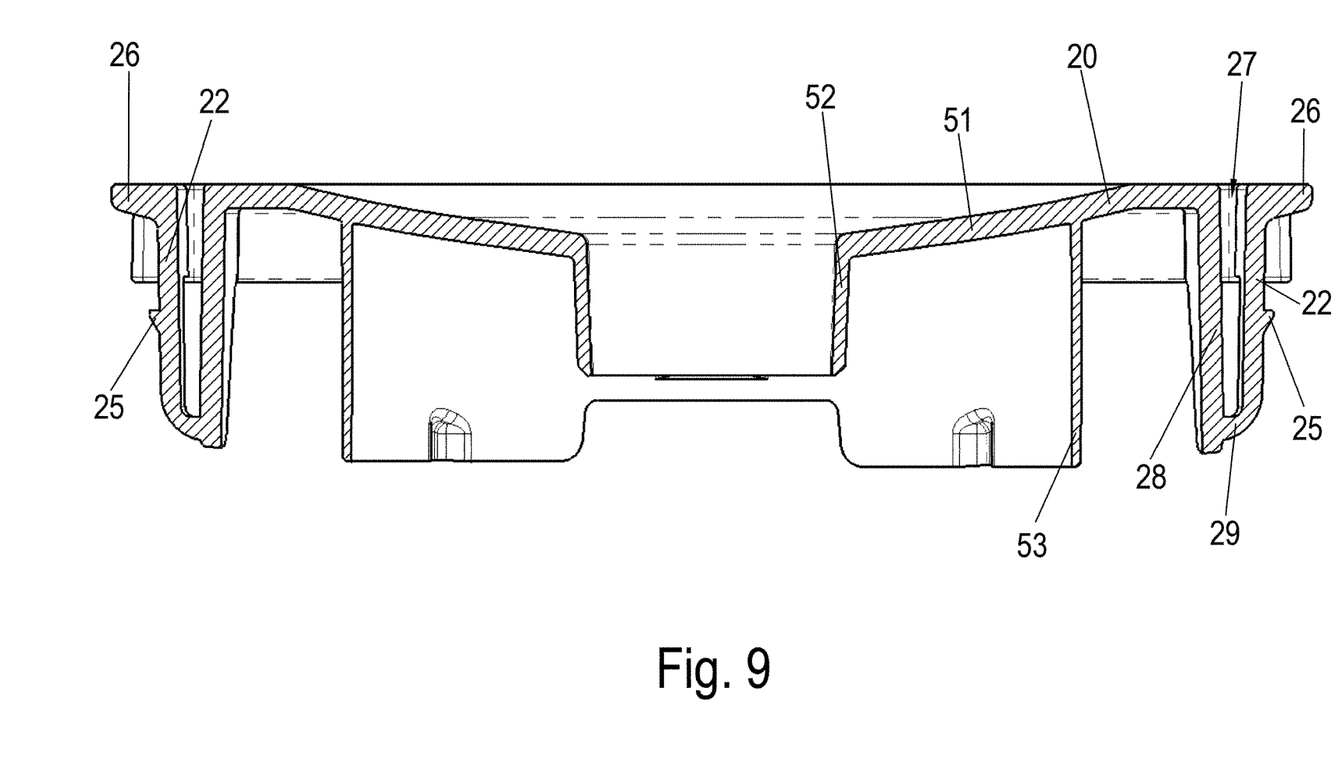
FIG. 9 shows a sectional view through the upper portion of the lid.

FIG. 9 shows a sectional view through the upper part 20 of the lid 6, in which the spring webs 22 are shown in closer detail. The spring webs 22 can be compressed on the actuating section 26 by a user in order to release latching on the container 4 and to remove the lid 6 in the upward direction. The bottom part 30 is held on the upper part 20.

The upper part 20 and the bottom part 30 can be produced integrally from plastic, and the valve 7 can also be made of plastic.

Two detents in form of spring webs 22 are provided in the illustrated embodiment, which spring webs are integrally formed on opposite sides of the upper part 20. It is obviously also possible to provide other detents 22 or only one detent or more than two detents. The container 4 can be a thermos flask 17 made of plastic or metal, and the container 4 can also comprise only one wall instead of a double-wall design which is insulated for example.

LIST OF REFERENCE NUMERALS

1 Coffee machine
2 Housing
3 Base plate
4 Container
5 Handle
6 Lid
7 Valve
8 Outlet
9 Receiver
10 Opening
11 Spout
12 Edge
13 Recess
14 Detent projection
15 Interior space
16 Insulating glass body
17 Flask housing
18 Receiver
19 Recess
20 Upper part
21 Depression
22 Spring web
23 Holder
24 Side wall
25 Detent projection
26 Actuating section
27 Gap
28 Side wall
29 Deflecting portion
30 Bottom part
31 Actuation element
32 Side wall
33 Limit stop
34 Wall
35 Wall
36 Edge
37 Edge
38 Recess
39 Step
40 Seal
41 Sealing lip
42 Web
43 Bulge
45 Section
46 Rib
50 Bearing pin
51 Receiver
52 Nozzle
55 Bearing receiver
70 Surface
71 Channel
72 Valve body
73 Holder
74 Seal
75 Spring
80 Spring

The invention claimed is:

1. A thermos flask, comprising:
a container having an upper side with an opening;
an actuation element; and
a lid held on the upper side to close the opening when the lid is in a closed position, the lid being operable to at least partially be moved by the actuation element to partially release the opening such that liquid can be poured out of the container, wherein the lid includes at least one detent and is held on the upper side of the container by the at least one detent;

wherein the at least one detent includes a flexible spring web;

wherein the container includes at least one detent projection and each flexible spring web comprises an outwardly facing detent projection which is in engagement with the at least one detent projection on the container to form a releasable detent connection; and wherein the at least one flexible spring web includes an actuating section by which the at least one flexible spring web is pressed inwardly for releasing the detent connection.

2. The thermos flask according to claim 1, wherein the at least one detent includes one flexible spring web located respectively on opposite sides of the lid.

3. The thermos flask according to claim 1, wherein the lid comprises an upper part fixed to the container and a bottom part that is pivotably mounted on the upper part.

4. The thermos flask according to claim 3, and further including an annular seal arranged around the opening of the container, on which the bottom part of the lid rests in the closed position.

5. The thermos flask according to claim 3, further including an annular seal arranged around the opening of the container on which the bottom part of the lid rests in the closed position, wherein the bottom part includes a downwardly protruding edge having at least one section presenting a venting opening and a recess for pouring, wherein the recess and the at least one section are arranged to seal the container beneath the seal in the closed position of the bottom part.

6. The thermos flask according to claim 3, wherein the upper part includes at least one rib and the container includes a pouring edge and at least one recess on the pouring edge, wherein during a mounting of the lid on the upper side of the container the lid is laterally displaceable in order to insert the at least one rib on the upper part into the at least one recess on the pouring edge of the container.

\* \* \* \* \*